(12) United States Patent
Imakita et al.

(10) Patent No.: US 11,507,073 B2
(45) Date of Patent: Nov. 22, 2022

(54) STATE DISPLAY DEVICE FOR PLANT AND STATE DISPLAY METHOD FOR PLANT

(71) Applicant: Mitsubishi Hitachi Power Systems, Ltd., Yokohama (JP)

(72) Inventors: Koji Imakita, Yokohama (JP); Toshihiko Niinomi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 232 days.

(21) Appl. No.: 16/632,682

(22) PCT Filed: Oct. 24, 2017

(86) PCT No.: PCT/JP2017/038368
§ 371 (c)(1),
(2) Date: Jan. 21, 2020

(87) PCT Pub. No.: WO2019/082275
PCT Pub. Date: May 2, 2019

(65) Prior Publication Data
US 2020/0249664 A1 Aug. 6, 2020

(51) Int. Cl.
*G05B 23/02* (2006.01)
(52) U.S. Cl.
CPC .................. *G05B 23/021* (2013.01)
(58) Field of Classification Search
None
See application file for complete search history.

(56) References Cited

U.S. PATENT DOCUMENTS 4,827,723 A * 5/1989 Engstrom ............. F01K 23/061
60/683
5,247,791 A * 9/1993 Pak ....................... F01K 21/047
60/39.182

(Continued)

FOREIGN PATENT DOCUMENTS

CN  103703425  4/2014
JP  11-095833  4/1999
(Continued)

OTHER PUBLICATIONS

English translation of Koda et al. Japanese Patent Publication JP 2012021487, published Feb. 2, 2012.*

(Continued)

*Primary Examiner* — Bernard G Lindsay
(74) *Attorney, Agent, or Firm* — Wenderoth, Lind & Ponack, L.L.P.

(57) ABSTRACT

A state display device 100 includes a display device 30 for displaying a temporal change of a first parameter representing an operation state of a thermal power generation facility 10, and a correlation between the first parameter and a second parameter representing an operation state of the thermal power generation facility 10, an input device 70 for respectively selecting and inputting a first period t1 and a second period t2 different from the first period t2 in the temporal change of the first parameter, and a processing device 50. The processing device 50 is configured to display the temporal change of the first parameter on the display device 30, and to display, on the display device 30, the correlation between the first parameter and the second parameter in each of the first period t1 and the second period t2 input via the input device 70.

14 Claims, 8 Drawing Sheets

(56) References Cited

U.S. PATENT DOCUMENTS

| | | | | |
|---|---|---|---|---|
| 5,968,263 | A * | 10/1999 | Grover | C30B 15/14 117/14 |
| 2009/0228408 | A1 | 9/2009 | Kaushal et al. | |
| 2014/0039834 | A1 * | 2/2014 | Shibuya | G06F 11/22 702/183 |
| 2014/0135947 | A1 | 5/2014 | Friman et al. | |
| 2016/0252015 | A1 * | 9/2016 | Kusumi | H02P 9/04 290/40 B |

FOREIGN PATENT DOCUMENTS

| | | |
|---|---|---|
| JP | 2004-171425 | 6/2004 |
| JP | 2004-192566 | 7/2004 |
| JP | 2006-266258 | 10/2006 |
| JP | 2007-002673 | 1/2007 |
| JP | 2008-151008 | 7/2008 |
| JP | 2016-018526 | 2/2016 |
| TW | 200951652 | 12/2009 |
| TW | 201702034 | 1/2017 |

OTHER PUBLICATIONS

Prasad et al. 'A Novel Performance Monitoring Strategy for Economical Thermal Power Plant Operation' IEEE Transactions on Energy Conversion, vol. 14, No. 3, pp. 802-809, Sep. 1999.*

Notification of Reason for Refusal dated Jun. 28, 2021 in corresponding Korean Patent Application No. 10-2020-7002688, with Machine Translation.

International Search Report dated Jan. 23, 2018 in International (PCT) Application No. PCT/JP2017/038368 with English translation.

English translation of International Preliminary Report on Patentability and Written Opinion of the International Searching Authority dated May 7, 2020 in International (PCT) Application No. PCT/JP2017/038368.

The 1st Office Action dated Oct. 16, 2019, in TW application No. 107137161.

The 2nd Office Action dated Apr. 13, 2020, in TW application No. 107137161.

Notice of Reasons for Refusal dated Apr. 6, 2021 in Japanese Application No. 2019-549718, with English-language translation.

* cited by examiner

STATE DISPLAY DEVICE FOR PLANT AND STATE DISPLAY METHOD FOR PLANT

TECHNICAL FIELD

The present invention relates to a state display device for a plant and a state display method for the plant for displaying information capable of appropriately evaluating the state of a plant such as a thermal power generation facility or a facility with a compressor.

BACKGROUND

In a plant such as a thermal power generation facility or a facility with a compressor, time degradation occurs along with a long-term operation. Therefore, for a stable operation of the plant, it is desirable to grasp the degree of the time degradation and to appropriately evaluate the state of the plant. In relation to a technique of displaying the performance of the plant to be evaluated appropriately, a technique described in Patent Document 1 is known. FIG. 4 of Patent Document 1 shows a time series graph of power generation efficiency.

CITATION LIST

Patent Literature

Patent Document 1: JP2007-2673A

SUMMARY

Technical Problem

However, even if a temporal change of one parameter indicating an operation state of a plant is analyzed, since other wide variety of parameters each indicating the operation state of the plant also change complexly, it is impossible to simply compare the above-described one parameter between different times.

For example, even with the time series graph of power generation efficiency described in Patent Document 1, it is difficult to grasp a difference in performance of a gas turbine between different times.

It is an object of at least one embodiment of the present invention to provide a state display device for the plant and a state display method for the plant for displaying information capable of appropriately evaluating a temporal change in the state of a plant in consideration of a change in operation state of the plant.

Solution to Problem (1) A state display device for a plant according to at least some embodiments of the present invention is a device for displaying a state of the plant in operation, the device including a display device for displaying a temporal change of a first parameter representing an operation state of the plant, and a correlation between the first parameter and a second parameter representing an operation state of the plant, an input device for respectively selecting and inputting a first period and a second period different from the first period in the temporal change of the first parameter, and a processing device. The processing device includes a depiction unit for displaying the temporal change of the first parameter on the display device, and for displaying, on the display device, the correlation between the first parameter and the second parameter in each of the first period and the second period input via the input device.

With the above configuration (1), it is possible to display information capable of appropriately evaluating a temporal change in the state of the plant by comparing the state of the plant defined by the first parameter and the second parameter between the selected first period and second period.

(2) In some embodiments, in the above configuration (1), the processing device includes a first approximate function calculation unit for calculating a first approximate function representing an approximate function with respect to the correlation between the first parameter and the second parameter in the first period, and a second approximate function calculation unit for calculating a second approximate function representing an approximate function with respect to the correlation between the first parameter and the second parameter in the second period, and the depiction unit is configured to display, on the display device, a graph of the first approximate function calculated by the first approximate function calculation unit and a graph of the second approximate function calculated by the second approximate function calculation unit.

With the above configuration (2), it is possible to display the approximate function for each of the selected first period and second period on the display device. Thus, it is possible to compare the two approximate functions on the display device. Accordingly, it is possible to display information enabling appropriate evaluation of the state of the plant intuitively through vision.

(3) In some embodiments, in the above configuration (1) or (2), the processing device includes a difference calculation unit for calculating a difference of the first parameter between the first period and the second period in a specified range of the second parameter if the specified range of the second parameter is input via the input device, and the depiction unit is configured to display the calculated difference on the display device.

With the above configuration (3), it is possible to display the difference of the first parameter in the specified range of the second parameter on the display device. Thus, it is possible to objectively evaluate the extent of change of the first parameter between the first period and the second period. Accordingly, it is possible to display information enabling appropriate evaluation of the state of the plant objectively.

(4) In some embodiments, in any one of the above configurations (1) to (3), the processing device includes a first correction unit for correcting the first parameter so as to match at least the second parameter with a reference value, the depiction unit is configured to display the temporal change of the corrected first parameter on the display device, and the processing device is configured to accept a selection input of the first period and the second period via the input device in the temporal change of the corrected first parameter displayed on the display device.

With the above configuration (4), it is possible to easily select the first period and the second period to be selected on the display device.

(5) In some embodiments, in any one of the above configurations (1) to (4), the processing device includes a second correction unit for correcting the first parameter so as to match at least one parameter except the second parameter with a reference value, and the depiction unit is configured to display the correlation between the corrected first parameter and the second parameter on the display device.

With the above configuration (5), it is possible to easily compare the respective correlations between the first parameter and the second parameter in the first period and the second period displayed on a display screen.

(6) In some embodiments, in any one of the above configurations (1) to (5), the depiction unit is configured to display, on the display device, the temporal change of the first parameter before correction, the temporal change of the first parameter after correction, or the temporal changes of both the first parameter before correction and the first parameter after correction to be switchable therebetween, in accordance with a display instruction input by the input device.

With the above configuration (6), it is possible to arbitrarily switch and display the type (before correction, after correction, and both before correction and after correction) of temporal change of the first parameter in accordance with an input by the user.

(7) In some embodiments, in any one of the above configurations (1) to (6), the second parameter includes a load of the plant.

With the above configuration (7), it is possible to specify the magnitude of the load of the plant, and to display information capable of evaluating the change of the first parameter between the first period and the second period when the plant is operated at a partial load (partial load state). Thus, it is possible to display the information capable of appropriately evaluating the change of the first parameter when the plant is operated at the partial load, in addition to when the plant is operated at a rated load, and to display the information capable of appropriately evaluating the state of the plant in the specified first period and second period.

(8) In some embodiments, in any one of the above configurations (1) to (7), the plant includes a thermal power generation facility, the first parameter includes thermal efficiency of the thermal power generation facility, and the second parameter includes a power generation output of the thermal power generation facility.

With the above configuration (8), it is possible to compare the thermal efficiency between the first period and the second period, and to display information capable of appropriately evaluating a temporal change of the thermal efficiency when the thermal power generation facility is operated with a power generation output less than a rated output. Accordingly, it is possible to display information capable of appropriately evaluating the state of the thermal power generation facility.

(9) In some embodiments, in any one of the above configurations (1) to (7), the plant includes a compressor, and each of the first parameter and the second parameter is any one of a temperature of air sucked in the compressor, a pressure ratio of a suction side and a discharge side of the compressor, an angle of an inlet guide vane of the compressor, a rotation speed of the compressor, or compression efficiency of the compressor.

With the above configuration (9), it is possible to display the information capable of appropriately evaluating the temporal change of the compressor by comparing the state of the compressor between the first period and the second period. Accordingly, it is possible to display the information capable of appropriately evaluating the state of the compressor.

(10) A state display method for a plant according to at least some embodiments of the present invention is a method for displaying a state of the plant in operation, the method including a temporal change display step of displaying, on a display device, a temporal change of a first parameter representing an operation state of the plant, and a correlation display step of displaying, on the display device, a correlation between the first parameter and a second parameter in each of a first period and a second period different from the first period in the temporal change of the first parameter, the first period and the second period being respectively selected and input by the input device.

With the above configuration (10), it is possible to display information capable of appropriately evaluating a temporal change in the state of the plant by comparing the state of the plant defined by the first parameter and the second parameter between the selected first period and second period.

Advantageous Effects

According to at least one embodiment of the present invention, it is possible to provide a state display device for a plant and a state display method for the plant for displaying information capable of appropriately evaluating a temporal change in the state of a plant in consideration of a change in operation state of the plant.

DETAILED DESCRIPTION

Figure 1:
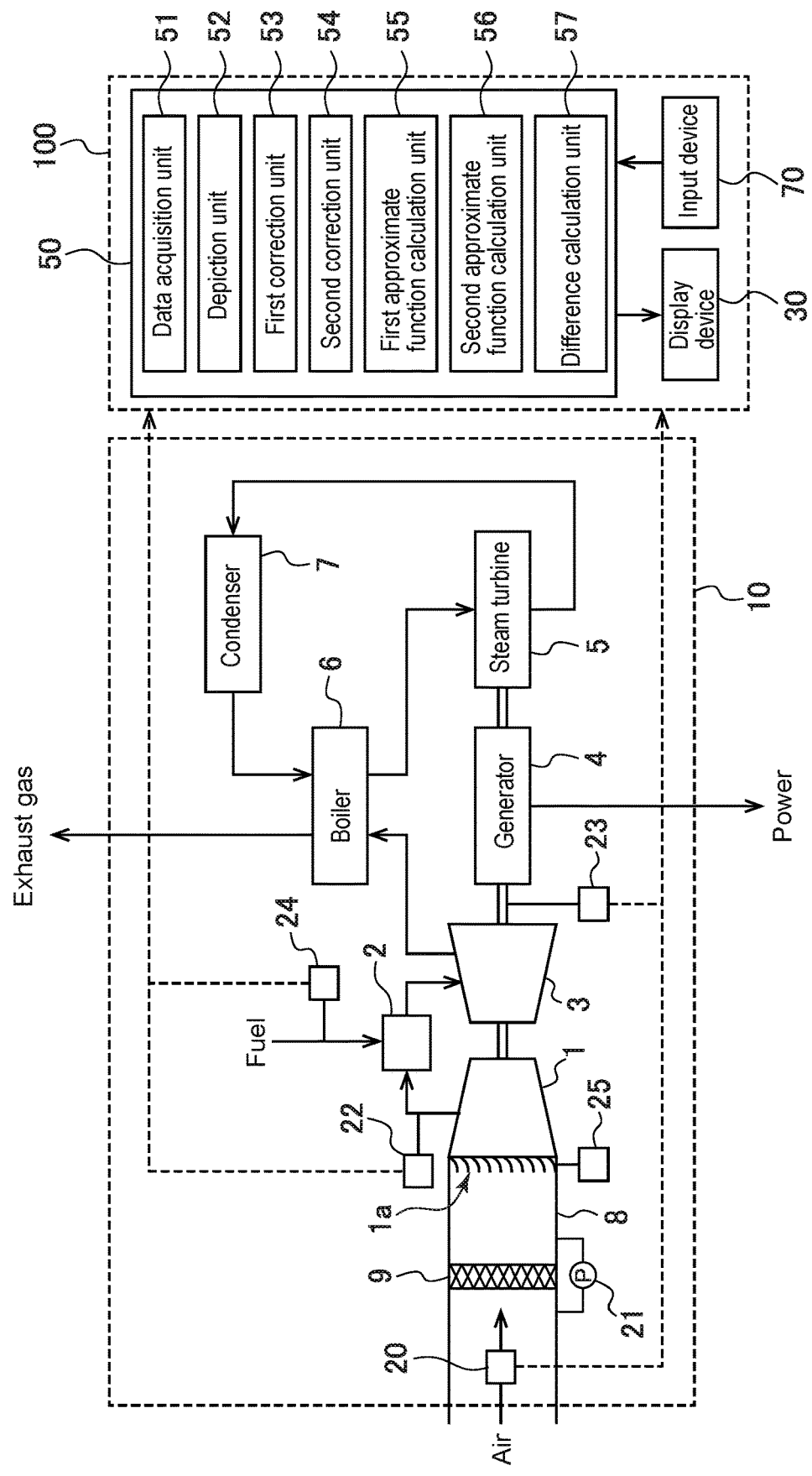
FIG. 1 is a diagram showing a state display device and a thermal power generation facility whose state is displayed by the state display device according to an embodiment of the present invention.

Embodiments of the present invention will now be described in detail with reference to the accompanying drawings. Contents described as embodiments and contents shown in the drawings below are merely examples, and can be modified arbitrarily within a scope that does not depart from the present invention. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

FIG. 1 is a diagram showing a state display device 100 and a thermal power generation facility 10 whose state is displayed by the state display device 100 according to an embodiment of the present invention. The thermal power generation facility 10 includes a compressor 1, a combustion chamber 2, a gas turbine 3, a generator 4, a steam turbine 5, a boiler 6, and a condenser 7. The thermal power generation facility 10 is a so-called combined cycle power generation facility.

The compressor 1 includes an inlet guide vane 1a on a suction side thereof, and a suction flow rate is controlled by changing the angle of the inlet guide vane 1a. The angle of the inlet guide vane 1a is changed by driving an actuator 25. In addition, the compressor 1 includes a ventilation passage 8 upstream thereof, and the ventilation passage 8 internally includes a filter 9 removing dust contained in air.

Furthermore, the thermal power generation facility 10 includes a sensor 20 which measures a temperature, humidity, and pressure of air sucked in the compressor 1, a sensor 21 which measures a differential pressure between the upstream and the downstream of the filter 9, a sensor 22 which measures a pressure of the compressor 1 on a discharge side, a sensor 23 for measuring a rotation output of the gas turbine 3, and a sensor 24 which measures a fuel consumption amount. In the present specification, a power generation amount by the steam turbine 5 is not considered for the sake of descriptive simplicity. However, the thermal power generation facility 10 may include a sensor which measures the power generation amount of the steam turbine 5.

Air taken from the outside is sucked in the compressor 1 after dust thereof is removed by the filter 9. The air is compressed by the compressor 1, and the compressed air is sent to the combustion chamber 2. The compressed air and fuel are mixed and combusted in the combustion chamber 2, obtaining a high-temperature combustion gas. Then, the gas turbine 3 is rotary driven by the combustion gas. Consequently, power is generated by the generator 4 connected to the gas turbine 3, obtaining power.

The combustion gas discharged from the gas turbine 3 still has heat. Thus, the discharged combustion gas is sent to the boiler 6, and water vapor is obtained by the heat of the combustion gas. The combustion gas after being sent to the boiler 6 and obtaining the water vapor is discharged outside as an exhaust gas. On the other hand, the water vapor obtained in the boiler 6 is supplied to the steam turbine 5, rotationally driving the steam turbine 5. Thus, the generator 4 connected to the steam turbine 5 generates power, obtaining power. The water vapor discharged from the steam turbine 5 is converted into liquid water by the condenser 7, and then supplied to the boiler 6.

The state display device 100 is a device for displaying the state of the thermal power generation facility 10 (an example of a plant) in operation. The state display device 100 includes a display device 30, a processing device 50, and an input device 70. Of the three devices, the display device 30 is used to display a temporal change of the first parameter (for example, thermal efficiency to be described later) representing the operation state of the thermal power generation facility 10, and a correlation between the first parameter and the second parameter (for example, a power generation output to be described later) representing the operation state of the thermal power generation facility 10. The display device 30 is, for example, a display (including a seven-segment method), a monitor, a lamp, or the like.

The input device 70 is used to respectively select and input a first period t1 (to be described alter) and a second period t2 (to be described later) different from the first period t1 in the temporal change of the first parameter. The first period t1 and the second period t2 are respectively selected and input via the input device 70 by a user. The input device 70 is, for example, a mouse, a keyboard, or a touch panel.

The processing device 50 includes a data acquisition unit 51, a depiction unit 52, a first correction unit 53, a second correction unit 54, a first approximate function calculation unit 55, a second approximate function calculation unit 56, and a difference calculation unit 57. The data acquisition unit 51 acquires measurement values from the above-described sensors 20, 21, 22, 23, and receives the first period t1 and the second period t2 input via the input device 70.

Moreover, the depiction unit 52 is used to display the temporal change of the first parameter on the display device 30, and to display, on the display device 30, the correlation between the first parameter and the second parameter in each of the first period t1 and the second period t2 input via the input device 70. The depiction unit 52 is configured to display, on the display device 30, the temporal change of the first parameter before correction, the temporal change of the first parameter after correction, or the temporal changes of both the first parameter before correction and the first parameter after correction to be switchable therebetween, in accordance with a display instruction input by the input device 70. Thus, it is possible to arbitrarily switch and display the type (before correction, after correction, and both before correction and after correction) of temporal change of the first parameter in accordance with an input by the user. Details of these points will be described later with reference to FIG. 5.

The first correction unit 53 is used to correct the first parameter so as to match at least the second parameter with a reference value. Then, the temporal change of the corrected first parameter is displayed on the display device 30 by the above-described depiction unit 52. The temporal change of the first parameter will be described with reference to FIG. 2.

Figure 2:
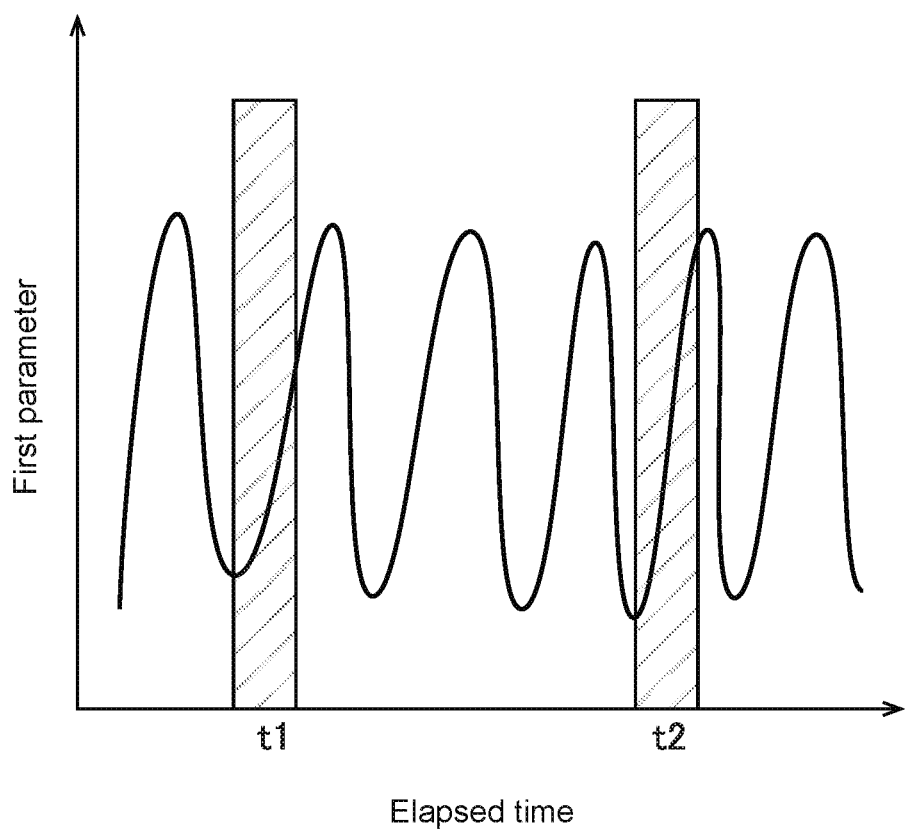
FIG. 2 is a graph showing a temporal change of the first parameter displayed on a display device.

FIG. 2 is a graph showing the temporal change of the first parameter displayed on the display device 30. The graph shown in FIG. 2 is a schematic graph used to describe one embodiment of the present invention, and an actual graph is not necessarily the same as the graph shown in FIG. 2 and is not limited to the graph shown in FIG. 2.

The graph shows the temporal change of the first parameter (for example, thermal efficiency) corrected so as to match at least the second parameter (for example, the power generation output (load)) with the reference value. Therefore, the graph shows how the first parameter changes over time, provided that at least the second parameter is in the same state. In addition to the above-described second parameter, parameters to be matched with the reference value include, for example, the temperature, pressure, and humidity of the air measured by the sensor 20, a pressure loss of the filter 9 measured by the sensor 21, and the like. A method of matching at least the second parameter with the reference value can be performed by using, for example, a regression expression calculated by a multiple classification analysis.

With reference to the graph shown in FIG. 2, the user (for example, an administrator of the thermal power generation facility 10) performs a selection input of the first period t1 and the second period t2 via the input device 70 in the temporal change of the first parameter after correction displayed on the display device 30. Therefore, the processing device 50 is configured to accept the selection input of the first period t1 and the second period t2 via the input device 70. Thus, it is possible to easily select the first period t1 and the second period t2 to be selected on the display device 30. The first period t1 and the second period t2 which have undergone the selection input by the user are two periods between which the user wants to compare the first parameter.

Referring back to FIG. 1, the second correction unit 54 is used to correct the first parameter so as to match at least one parameter except the second parameter with the reference value. Then, a correlation between the second parameter and the corrected first parameter is displayed on the display device 30 by the above-described depiction unit 52. Thus, it is possible to easily compare the respective correlations between the first parameter and the second parameter in the first period t1 and the second period t2 displayed on the display device 30. The correlation between the first parameter and the second parameter will be described with reference to FIG. 3.

Figure 3:
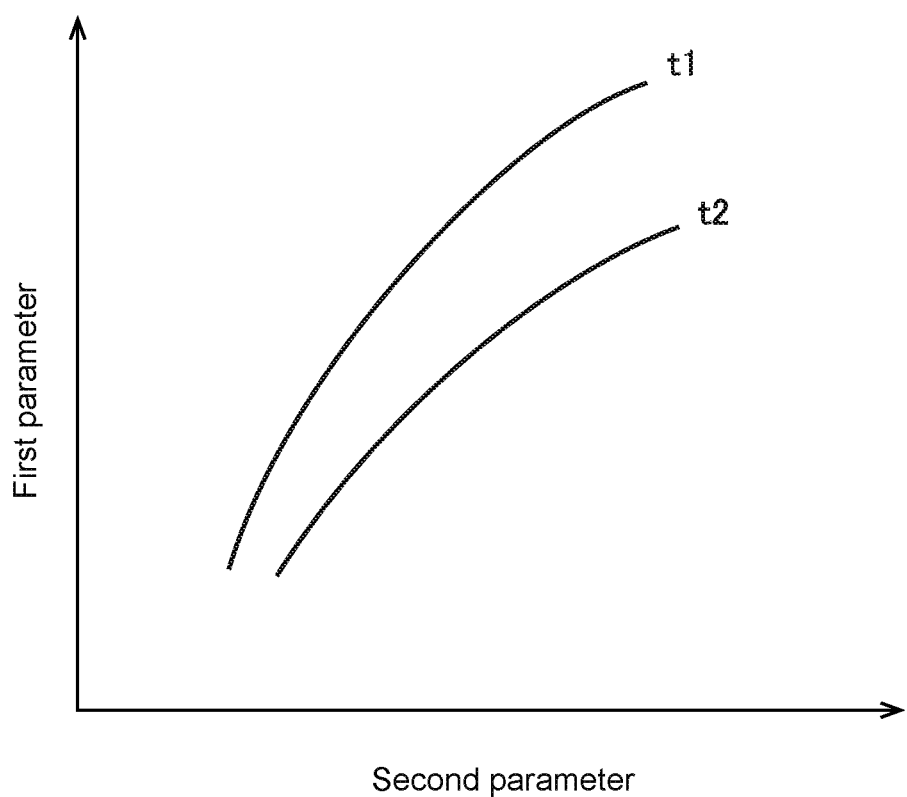
FIG. 3 is a graph showing correlations between the first parameter and the second parameter displayed on the display device.

FIG. 3 is a graph showing the correlations between the first parameter and the second parameter displayed on the display device 30. The graph shown in FIG. 3 is a schematic graph used to describe one embodiment of the present invention, and an actual graph is not necessarily the same as the graph shown in FIG. 3 and is not limited to the graph shown in FIG. 3.

Reference characters t1 and t2 shown in the graph correspond to the first period t1 and the second period t2 described above. FIG. 3 shows how the second parameter changes as the first parameter changes in each of the first period t1 and the second period t2.

In the first period t1 and the second period t2, at least one parameter other than the first parameter and the second parameter is matched with the reference value. Therefore, the graph shows how the second parameter changes as the first parameter changes, provided that at least one parameter except "the first parameter and the second parameter" is in the same state. Parameters to be matched with the reference value are parameters other than the first parameter and the second parameter. More specifically, the parameters include, for example, the temperature, pressure, and humidity of the air measured by the sensor 20, the pressure loss of the filter 9 measured by the sensor 21, and the like. A method of matching at least one parameter other than the first parameter and the second parameter with the reference value can be performed by using, for example, the regression expression calculated by the multiple classification analysis.

Referring back to FIG.1, the first approximate function calculation unit 55 is used to calculate a first approximate function representing an approximate function with respect to the correlation between the first parameter and the second parameter in the first period t1 (see FIG. 3). In addition, the second approximate function calculation unit 56 is used to calculate a second approximate function representing an approximate function with respect to the correlation between the first parameter and the second parameter in the second period t2 (see FIG. 3). Then, a graph of the first approximate function calculated by the first approximate function calculation unit 55 and a graph of the second approximate function calculated by the second approximate function calculation unit 56 are displayed on the display device 30 by the depiction unit 52. Thus, it is possible to display the approximate function for each of the selected first period t1 and second period t2 on the display device 30. Thus, it is possible to compare the two approximate functions on the display device 30. Accordingly, it is possible to display information enabling appropriate evaluation of the state of the thermal power generation facility 10 intuitively through vision.

The difference calculation unit 57 is used to calculate a difference of the first parameter between the first period t1 and the second period t2 in a specified range of the second parameter if the specified range of the second parameter is input via the input device 70. More specifically, for example, the difference calculation unit 57 calculates the difference between a value of the first parameter in the first period t1 and a value of the first parameter in the second period t2 when the user specifies a value of the second parameter via the input device 70 in FIG. 3 described above. The value of the first parameter in the first period t1 is calculated based on, for example, the first approximate function to be described later. In addition, the value of the first parameter in the second period t2 is calculated based on, for example, the second approximate function to be described later. Then, the difference thus calculated is displayed on the display device 30 by the depiction unit 52.

Thus, it is possible to display the difference of the first parameter in the specified range of the second parameter on the display device 30. Thus, it is possible to display information capable of objectively evaluating the extent of change of the first parameter between the first period t1 and the second period t2. Accordingly, it is possible to display information enabling appropriate evaluation of the state of the thermal power generation facility 10 objectively.

The user may specify not a single value but an extended range (the specified range of the second parameter) when specifying the second parameter in FIG. 3 described above. In this case, the difference of the first parameter between the first period t1 and the second period t2 is also calculated as not the single value but the extended range.

Figure 4:
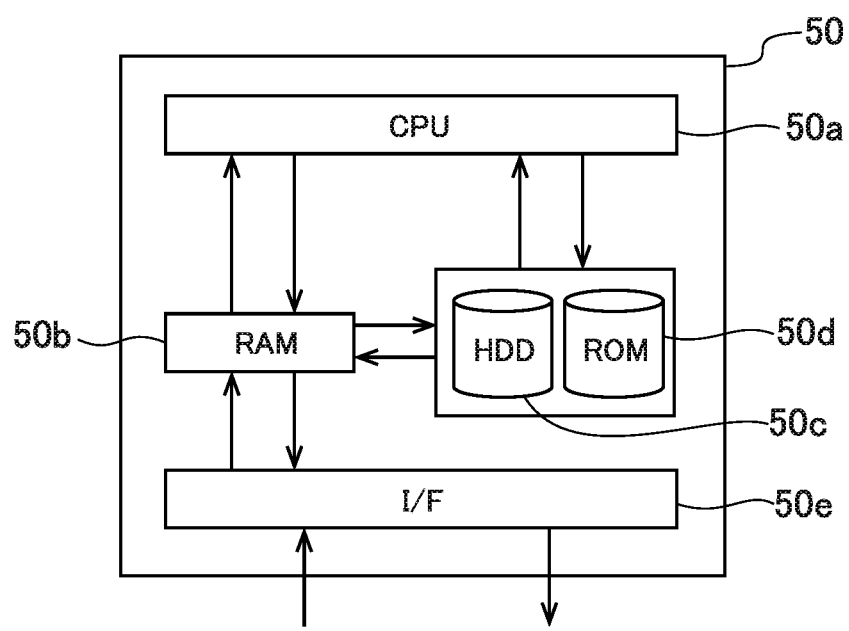
FIG. 4 is a block diagram showing specific hardware resources of a processing device.

FIG. 4 is a block diagram showing specific hardware resources of the processing device 50. The processing device 50 includes a central processing unit (CPU) 50a, a random access memory (RAM) 50b, a hard disk drive (HDD) 50c, a read only memory (ROM) 50d, and an interface (I/F) 50e. Then, the processing device 50 is embodied by causing the CPU 50a to load predetermined control programs stored in the HDD 50c and the ROM 50d into the RAM 50b to execute the programs. Moreover, the sensors 20, 21, 22, 23, 24, and the actuator 25 shown in FIG. 1 are connected to the I/F 50e by an electrical signal line (not shown).

Figure 5:
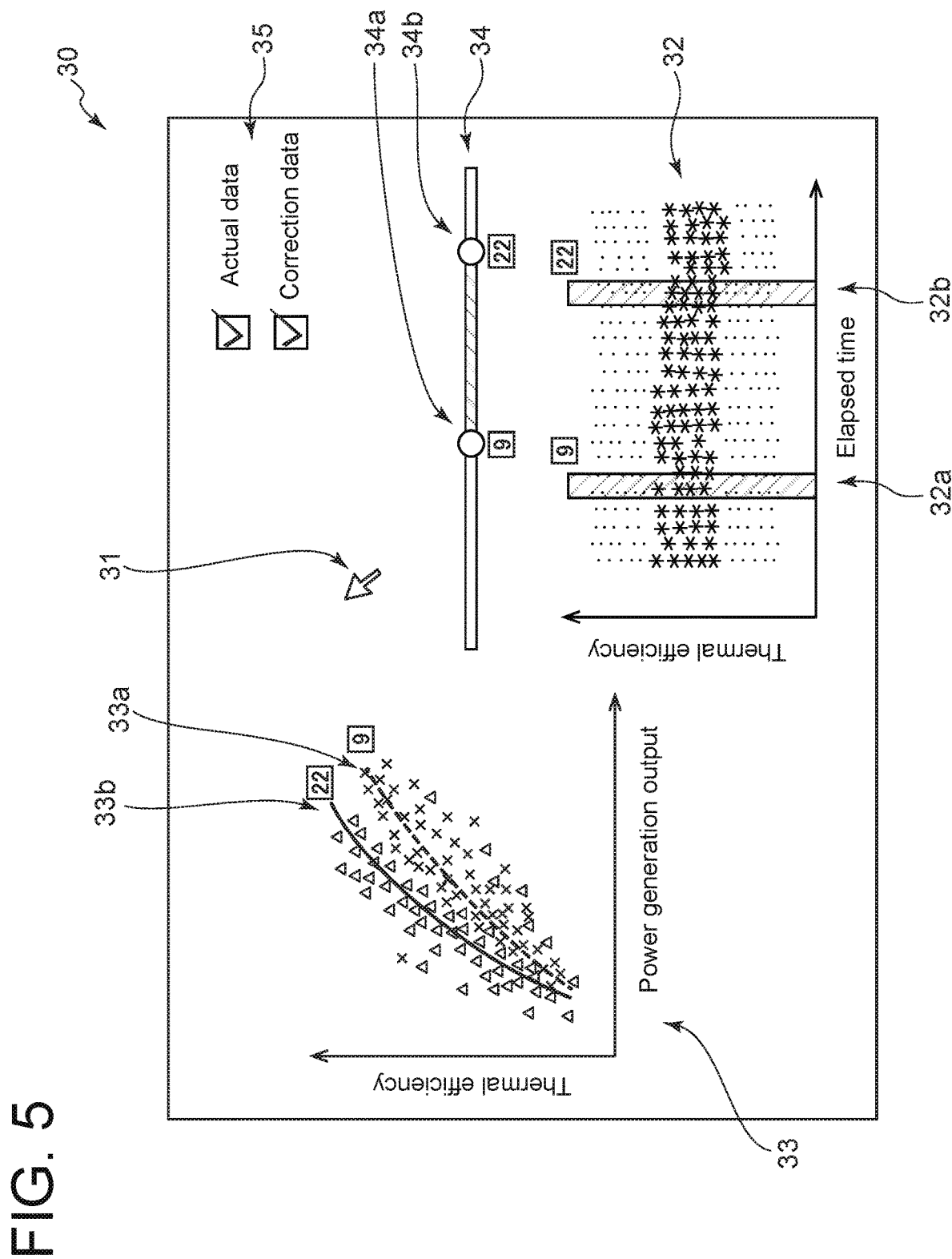
FIG. 5 is a view showing a display screen displayed on the display device.

FIG. 5 is a view showing a display screen displayed on the display device 30. Graphs shown in FIG. 5 and FIG. 6 to be described later are schematic graphs used to describe one embodiment of the present invention, and actual graphs are not necessarily the same as the graphs shown in FIGS. 5 and 6 and are not limited to the graphs shown in FIGS. 5 and 6.

FIG. 5 exemplifies the thermal efficiency of the thermal power generation facility 10 as the first parameter and the power generation output (load) of the thermal power generation facility 10 as the second parameter, for the sake of descriptive simplicity. The thermal efficiency of the thermal power generation facility 10 represents, for example, a fuel consumption amount used to produce a unit power generation amount and is the inverse ratio of the heat rate. Therefore, it is preferable that the value of the thermal efficiency is small. Moreover, in the thermal power generation facility 10, the power generation output and the load are the same meanings.

Using the power generation output (load) as the first parameter, it is possible to specify the magnitude of the power generation output of the thermal power generation facility 10, and to evaluate the change of the first parameter between the first period t1 and the second period t2 when the thermal power generation facility 10 is operated with a partial power generation output (partial load state). Thus, it is possible to display the information capable of appropriately evaluating the change of the first parameter when the thermal power generation facility 10 is operated at the partial load, in addition to when the thermal power generation facility 10 is operated at a rated load, and to display the information capable of appropriately evaluating the state of the thermal power generation facility 10 in the specified first period t1 and second period t2.

In addition, in a case in which the plant is the thermal power generation facility 10, using the power generation output as the first parameter and the thermal efficiency as the second parameter, it is possible to compare the thermal efficiency between the first period t1 and the second period t2, and to display information capable of appropriately evaluating a temporal change of the thermal efficiency when the thermal power generation facility 10 is operated with the power generation output less than a rated output. Accordingly, it is possible to display information capable of appropriately evaluating the state of the thermal power generation facility 10.

The display device 30 displays a pointer 31 moved by the input device 70, a graph 32 showing the temporal change of the thermal efficiency (first parameter), a graph 33 showing correlations between the power generation output (second parameter) and the thermal efficiency (second parameter), a slider 34 for specifying the first period t1 and the second period t2, and a switching box 35 switching data displayed in the graph 32.

In FIG. 5, a display instruction where both actual data and correction data are displayed is input to the switching box 35 via the input device 70. Thus, in the graph 32, both a temporal change of the thermal efficiency before correction (relation indicated by "•") and a temporal change of the thermal efficiency after correction (relation indicated by "*") are displayed. That is, the temporal change of the thermal efficiency before correction is the actual data, and a result obtained by making correction to match a parameter representing an operation state other than the thermal efficiency with a reference value (the same value for each parameter) is the correction data. However, only one of the data may be displayed by changing the display instruction.

In graph 32, plots of "•" are hidden behind plots of "*", although not shown for the sake of illustrative simplicity. Therefore, the plots of "•" exist evenly over an entire region from low thermal efficiency to high thermal efficiency.

In addition, in the bottom-right graph 32, the first period t1 and the second period t2 specified via the input device 70 are displayed. As the first period t1, the 9th week indicating a period since a vane of the gas turbine 3 is last cleaned is exemplified. As the second period t2, the 22nd week indicating a period since the vane of the gas turbine 3 is last cleaned is exemplified. The first period t1 and the second period t2 can be specified by setting the pointer 31 on buttons 34a, 34b via the input device 70, and moving the buttons 34a, 34b from side to side on the slider 34. Then, the first period t1 and the second period t specified in the slider 34 are respectively displayed at corresponding positions on the abscissa of the graph 32.

The left graph 33 shows a relationship between the power generation output and the thermal efficiency in each of the first period t1 and the second period t2 specified in the slider 34 described above. That is, the graph 33 shows a result obtained by making correction to match a parameter representing an operation state other than "the thermal efficiency and the power generation output" with a reference value (the same value for each parameter) for each of the first period t1 and the second period t2. As described above, it is preferable that the value of the thermal efficiency is small. Therefore, in the graph 33, the thermal efficiency decreases over time, and the value of the thermal efficiency increases as time advances from the 9th week to the 22nd week.

In the graph 33, correlations of the first period t1 (9th week) are indicated by "Δ", and correlations of the second period t2 (22nd week) are indicated by "×". In addition, a graph 33a of a first approximate function (approximate curve) with respect to the correlations of the first period t1 is indicated by a dashed line, and a graph 33b of a second approximate function (approximate curve) with respect to the correlations of the second period t2 is indicated by a solid line. Thus indicating the graph 33a and the graph 33b, a comparison between the first period t1 and the second period t2 is made easily.

Figure 6:
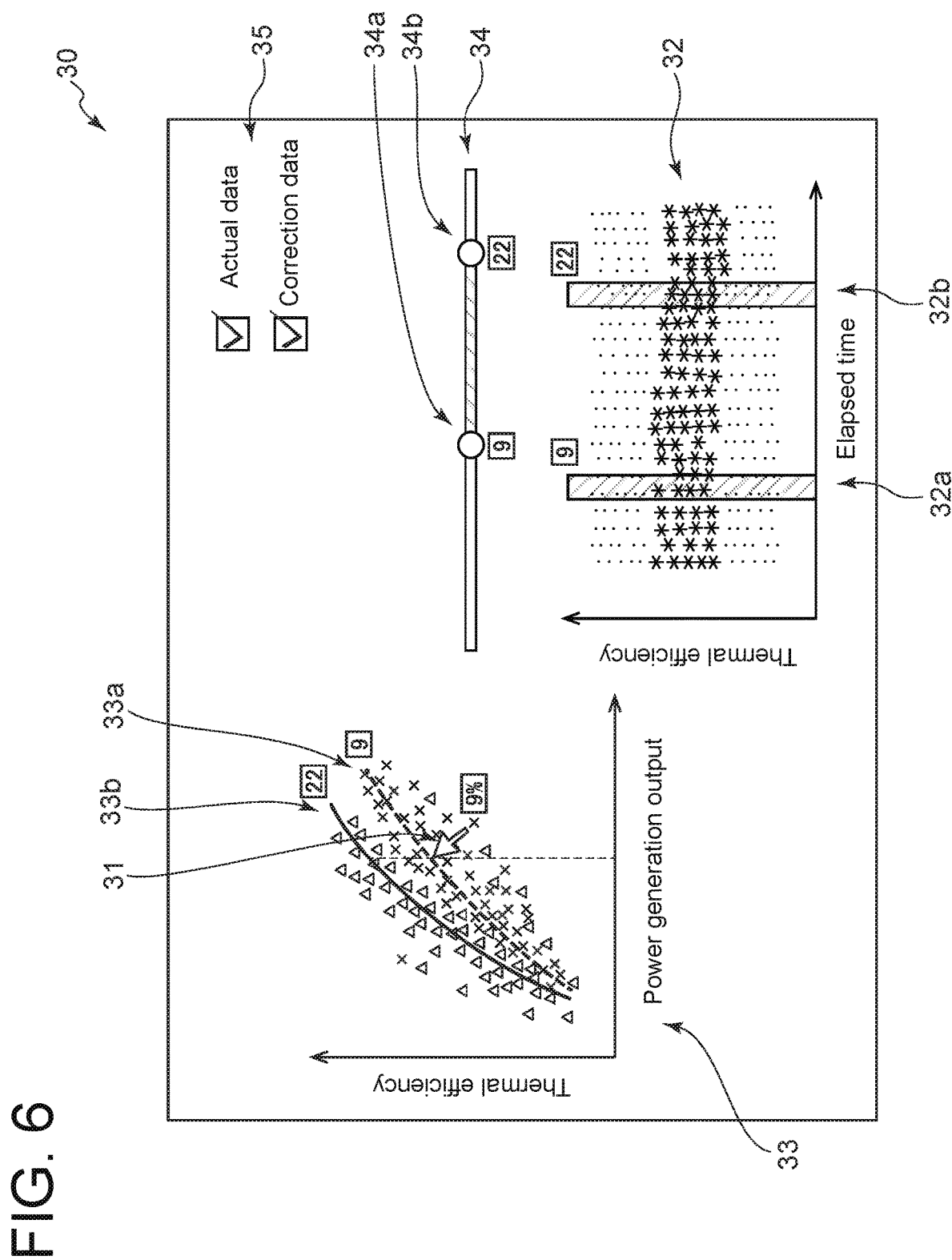
FIG. 6 is a view showing a state in which a difference between thermal efficiency of the 9th week and thermal efficiency of the 22nd week is displayed by moving a pointer on the display screen shown in FIG. 5.

FIG. 6 is a view showing a state in which a difference between the thermal efficiency of the 9th week and the thermal efficiency of the 22nd week is displayed by moving the pointer 31 on the display screen shown in FIG. 5 described above. If the user moves the pointer 31 onto the graph 33 via the input device 70, a difference between the graph 33a of the first period tl and the graph 33b of the second period t2 is displayed in a power generation output (exemplifying 60%) pointed by the pointer 31. Herein, "9%" is indicated as the difference, for the sake of convenience. Therefore, the power generation output of 60% (that is, the partial load operation of 60%) represents that the value of the thermal efficiency increases by 9 from the first period (9th week) to the second period t2 (22nd week). As described above, since the value of the thermal efficiency is preferably small, it can be said that thermal efficiency decreases by 9% from the first period (9th week) to the second period t2 (22nd week).

Figure 7:
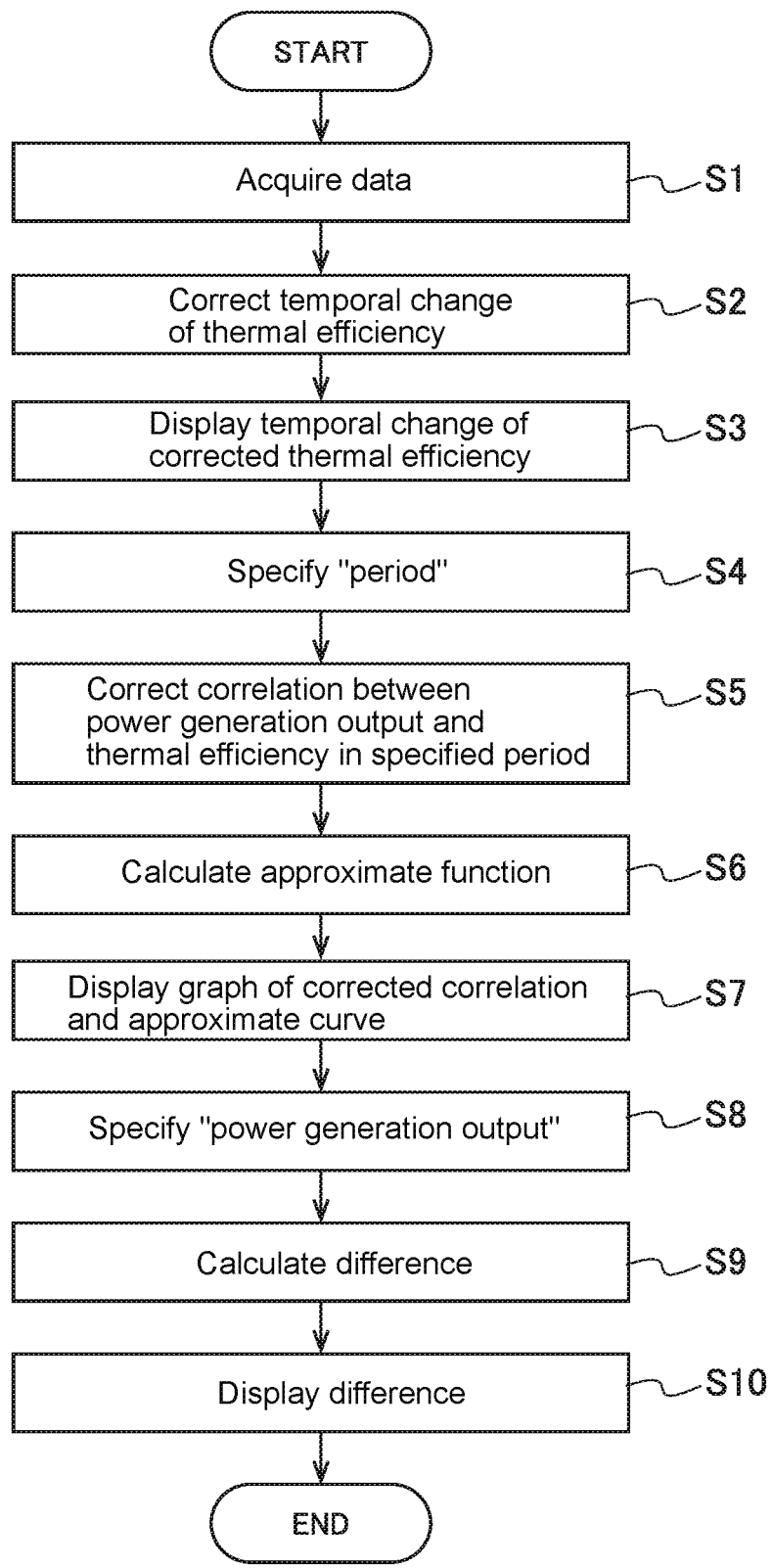
FIG. 7 is a flowchart of a flow performed in the state display device according to an embodiment of the present invention.

FIG. 7 shows a flow performed in the state display device 100 according to an embodiment of the present invention. Since the flow shown in FIG. 7 is performed by the state display device 100 shown in FIG. 1 described above, the following description will be given with reference to FIG. 1 as needed.

First, the data acquisition unit 51 acquires data in the thermal power generation facility 10 (step 51). The data acquired here is a power generation amount (power generation output, turbine output) per unit time by the sensor 23 connected to the gas turbine 3, the fuel consumption amount measured by the sensor 24, and the like. Then, the first correction unit 53 calculates thermal efficiency based on the acquired data and corrects a temporal change of the thermal efficiency (step S2). The thermal efficiency can be calculated by, for example, dividing the fuel consumption amount by the power generation amount. Moreover, the correction can be made by, for example, the methods described above with reference to FIGS. 1, 2, and the like. Next, the depiction unit 52 displays the corrected temporal change of the thermal efficiency on the display device 30 (step S3, see the graph 32 of FIG. 5, temporal change display step).

Then, specifying a "period" of the first period t1 and the second period t2 via the input device 70 by the user (step S4), the second correction unit 54 corrects correlations between the power generation output and the thermal efficiency in the specified first period t1 and second period t2 (step S5). A specific correction method can be performed by the methods described above with reference to FIGS. 1, 3, and the like. Then, the first approximate function calculation unit 55 and the second approximate function calculation unit 56 respectively calculate the first approximate function in the first period t1 and the second approximate function in the second period t2 (step S6). Next, the depiction unit 52 displays, on the display device 30, the respective graphs of the calculated first approximate function and second approximate function, and the correlations between the power generation output and the thermal efficiency in the first period t1 and the second period t2 (step S7, see the graph 33 of FIG. 5, correlation display step).

Specifying the "power generation output" via the input device 70 by the user referring to the display device 30 (step S8), the difference calculation unit 57 calculate the difference between the thermal efficiency in the first period t1 and the thermal efficiency in the second period t2 (step S9). As a specific calculation method, for example, the methods described above with reference to FIGS. 1, 6, and the like can be used. Then, the depiction unit 52 displays the differential calculated by the difference calculation unit 57 on the display device 30 (step S10, see FIG. 6).

According to the above flow shown in FIG. 7, it is possible to display information capable of appropriately evaluating a temporal change in the state of the thermal power generation facility 10 by comparing the state of the thermal power generation facility 10 defined by the thermal efficiency (first parameter) and the power generation output (second parameter) between the selected first period t1 and second period t2.

Figure 8:
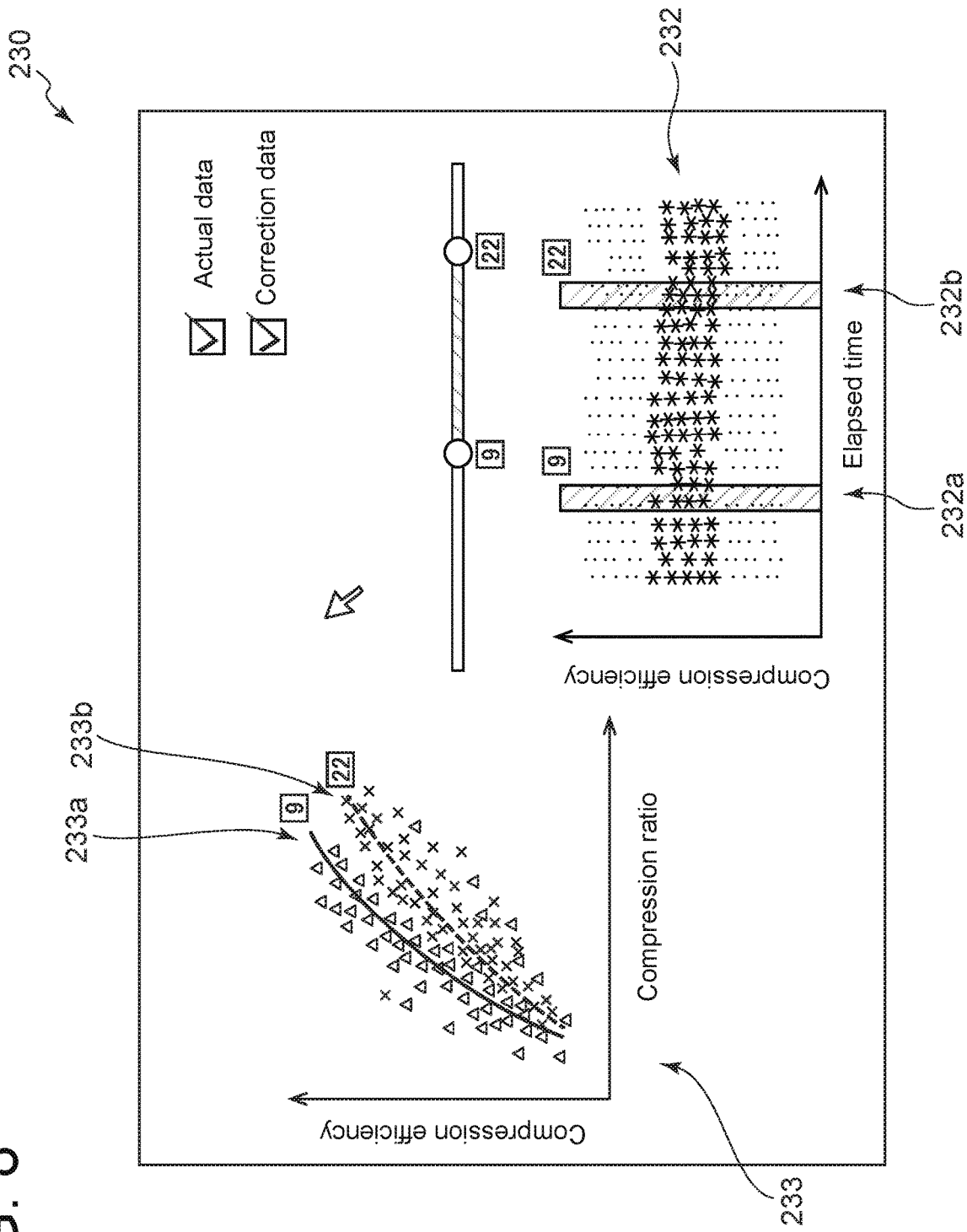
FIG. 8 is a view showing a display screen in the display device when the state display device is applied to a compressor according to an embodiment of the present invention.

FIG. 8 is a view showing a display screen in the display device 30 when the state display device 100 is applied to the compressor 1 according to an embodiment of the present invention. In the above example, the thermal efficiency as the first parameter and the power generation output as the second parameter are exemplified by focusing on the combustion chamber 2, the gas turbine 3, and the generator 4. However, in the embodiment (the plant including the compressor) shown in FIG. 8, compression efficiency of the compressor 1 as the first parameter, and the pressure ratio of a suction side and a discharge side of the compressor 1 as the second parameter are exemplified by focusing on the compressor 1.

However, the first parameter and the second parameter are not limited to the above example, and each of the parameters can arbitrarily select any one of the temperature of the air sucked in the compressor, the pressure ratio of the suction side and the discharge side of the compressor 1, the angle of the inlet guide vane 1a of the compressor 1, the rotation speed of the compressor 1, or the compression efficiency of the compressor 1. Thus, it is possible to display the information capable of appropriately evaluating the temporal change of the compressor 1 by comparing the state of the compressor 1 between the first period t1 and the second period t2. Accordingly, it is possible to display the information capable of appropriately evaluating the state of the compressor 1.

In FIG. 8, a bottom-right graph 232 shows an elapsed time of the compression efficiency of the compressor 1. In the graph 232, both the temporal change of the compression efficiency before correction (relation indicated by "•") and the temporal change of the compression efficiency after correction (relation indicated by "*") are displayed, as in the graph 32 described above. In addition, a left graph 233 shows the pressure ratio of the suction side and the discharge side of the compressor 1 on the abscissa and the compression efficiency of the compressor 1 on the ordinate. Then, similarly to FIG. 5 described above, a graph 233a shows compression efficiency of the 9th week as the first period t1 by a solid line, and a graph 233b shows compression efficiency of the 22nd week as the second period t2 by a dashed line. In the graph 232, plots of "•" are hidden behind plots of "*", although not shown for the sake of illustrative simplicity. Therefore, the plots of "•" exist evenly over an entire region from low compression efficiency to high compression efficiency.

In the compressor 1, similarly to the thermal efficiency described above, the compression efficiency decreases over time. Thus, for example, the relationship between the pressure ratio and the compression efficiency is graphically shown for each of the first period t1 and the second period t2 as shown in FIG. 8, making it possible to display information capable of evaluating degradation in compression efficiency in a part of a rated state of the pressure ratio of the suction side and the discharge side of the compressor 1.

REFERENCE SIGNS LIST

1 Compressor
1a Inlet guide vane
2 Combustion chamber
3 Gas turbine
4 Generator
5 Steam turbine
6 Boiler
7 Condenser
8 Ventilation passage
9 Filter
10 Thermal power generation facility
20, 21, 22, 23, 24 Sensor
25 Actuator
30 Display device
31 Pointer
32, 33, 33a, 33b, 232, 233, 233a, 233b Graph
34 Slider
34a, 34b Button
35 Switching box
50 Processing device
50a CPU
50b RAM
50c HDD
50d ROM
50e I/F
51 Data acquisition unit
52 Depiction unit
53 First correction unit
54 Second correction unit
55 First approximate function calculation unit
56 Second approximate function calculation unit
57 Difference calculation unit
70 Input device
100 State display device

The invention claimed is:
1. A state display device for a plant for displaying a state of the plant in operation, the device comprising:

a display device for displaying a temporal change of a first parameter representing an operation state of the plant, and a correlation between the first parameter and a second parameter representing an operation state of the plant;

an input device for respectively selecting and inputting a first period and a second period different from the first period in the temporal change of the first parameter; and a processing device including a processor, wherein the processing device is configured to cause the processor to execute a program to function as a depiction unit for displaying the temporal change of the first parameter on the display device, and for displaying, on the display device, the correlation between the first parameter and the second parameter in each of the first period and the second period input via the input device; and a correction unit for correcting the first parameter such that at least the second parameter is matched with a reference value or such that at least one parameter except the second parameter is matched with a reference value, wherein the processor executing the program is configured to display the temporal change of the corrected first parameter on the display device, the temporal change of the corrected first parameter indicating how the first parameter changes over time provided that at least the second parameter remains the same, and wherein the processor executing the program is configured to accept a selection input of the first period and the second period via the input device in the temporal change of the corrected first parameter displayed on the display device, or wherein the processor executing the program is configured to display the correlation between the corrected first parameter and the second parameter on the display device, the correlation between the corrected first parameter and the second parameter indicating how the second parameter changes as the first parameter changes provided that the at least one parameter except the second parameter remains the same.

2. The state display device for the plant according to claim 1, wherein the processing device is configured to cause the processor to execute the program to function as:

a first approximate function calculation unit for calculating a first approximate function representing an approximate function with respect to the correlation between the first parameter and the second parameter in the first period; and a second approximate function calculation unit for calculating a second approximate function representing an approximate function with respect to the correlation between the first parameter and the second parameter in the second period, and wherein the processor executing the program is configured to display, on the display device, a graph of the first approximate function calculated by the first approximate function calculation unit and a graph of the second approximate function calculated by the second approximate function calculation unit.

3. The state display device for the plant according to claim 1, wherein the processing device is configured to cause the processor to execute the program to function as a difference calculation unit for calculating a difference of the first parameter between the first period and the second period in a specified range of the second parameter if the specified range of the second parameter is input via the input device, and wherein the processor executing the program is configured to display the calculated difference on the display device.

4. The state display device for the plant according to claim 1, wherein the processor executing the program is configured to display, on the display device, the temporal change of the first parameter before correction, the temporal change of the first parameter after correction, or the temporal change of each of the first parameter before correction and the first parameter after correction to be switchable therebetween, in accordance with a display instruction input by the input device.

5. The state display device for the plant according to claim 1, wherein the second parameter includes a load of the plant.

6. The state display device for the plant according to claim 1, wherein the processor executing the program is configured to display, on a display screen of the display device, both a graph showing the temporal change of the first parameter, and a graph showing the correlation between the first parameter and the second parameter in each of the first period and the second period.

7. The state display device for the plant according to claim 1, wherein the plant includes a thermal power generation facility, wherein the first parameter includes thermal efficiency of the thermal power generation facility, and wherein the second parameter includes a power generation output of the thermal power generation facility.

8. The state display device for the plant according to claim 1, wherein the plant includes a compressor, and wherein each of the first parameter and the second parameter is any one of a temperature of air sucked in the compressor, a pressure ratio of a suction side and a discharge side of the compressor, an angle of an inlet guide vane of the compressor, a rotation speed of the compressor, or compression efficiency of the compressor.

9. A state display device for a plant for displaying a state of the plant in operation, the device comprising:

a display device for displaying a temporal change of a first parameter representing an operation state of the plant, and a correlation between the first parameter and a second parameter representing an operation state of the plant;

an input device for respectively selecting and inputting a first period and a second period different from the first period in the temporal change of the first parameter; and a processing device including a processor, wherein the processing device is configured to cause the processor to execute a program to function as:

a depiction unit for displaying the temporal change of the first parameter on the display device, and for displaying, on the display device, the correlation between the first parameter and the second parameter in each of the first period and the second period input via the input device; and a correction unit for correcting the first parameter such that at least the second parameter is matched with a reference value, wherein the processor executing the program is configured to display the temporal change of the corrected first parameter on the display device, the temporal change of the corrected first parameter indicating how the first parameter changes over time provided that at least the second parameter remains the same, and wherein the processor executing the program is configured to accept a selection input of the first period and the second period via the input device in the temporal change of the corrected first parameter displayed on the display device.

10. The state display device for the plant according to claim 9, wherein the processor executing the program is configured to display, on a display screen of the display device, both the temporal change of the first parameter, and the correlation between the first parameter and the second parameter in each of the first period and the second period.

11. A state display device for a plant for displaying a state of the plant in operation, the device comprising:

a display device for displaying a temporal change of a first parameter representing an operation state of the plant, and a correlation between the first parameter and a second parameter representing an operation state of the plant;

an input device for respectively selecting and inputting a first period and a second period different from the first period in the temporal change of the first parameter; and a processing device including a processor, wherein the processing device is configured to cause the processor to execute a program to function as:

a depiction unit for displaying the temporal change of the first parameter on the display device, and for displaying, on the display device, the correlation between the first parameter and the second parameter in each of the first period and the second period input via the input device; and a correction unit for correcting the first parameter such that at least one parameter except the second parameter is matched with a reference value, and wherein the processor executing the program is configured to display the correlation between the corrected first parameter and the second parameter on the display device, the correlation between the corrected first parameter and the second parameter indicating how the second parameter changes as the first parameter changes provided that the at least one parameter except the second parameter remains the same.

12. A state display method for a plant for displaying a state of the plant in operation with a state display device which includes: a display device for displaying a temporal change of a first parameter representing an operation state of the plant, and a correlation between the first parameter and a second parameter representing an operation state of the plant; an input device for respectively selecting and inputting a first period and a second period different from the first period in the temporal change of the first parameter; and a processing device including a processor, the method comprising causing the processor to execute a program to perform steps of:

displaying, on a display device, a temporal change of a first parameter representing an operation state of the plant;

displaying, on the display device, a correlation between the first parameter and a second parameter in each of a first period and a second period different from the first period in the temporal change of the first parameter, the first period and the second period being respectively selected and input by the input device; and correcting the first parameter such that at least one parameter except the second parameter is matched with a reference value, wherein the correlation between the corrected first parameter and the second parameter is displayed on the display device, the correlation between the corrected first parameter and the second parameter indicating how the second parameter changes as the first parameter changes provided that the at least one parameter except the second parameter remains the same.

13. The state display method for the plant according to claim 12, wherein both the temporal change of the first parameter, and the correlation between the first parameter and the second parameter in each of the first period and the second period are displayed on a display screen of the display device.

14. The state display method for the plant according to claim 13, wherein both a graph showing the temporal change of the first parameter, and a graph showing the correlation between the first parameter and the second parameter in each of the first period and the second period are displayed on the display screen.

* * * * *